US009378139B2

(12) United States Patent
Ricketts et al.

(10) Patent No.: US 9,378,139 B2
(45) Date of Patent: Jun. 28, 2016

(54) SYSTEM, METHOD, AND COMPUTER PROGRAM PRODUCT FOR LOW LATENCY SCHEDULING AND LAUNCH OF MEMORY DEFINED TASKS

(71) Applicant: NVIDIA Corporation, Santa Clara, CA (US)

(72) Inventors: Scott Ricketts, San Francisco, CA (US); Brian Scott Pharris, Cary, NC (US); Nicholas Wang, Saratoga, CA (US); Luke David Durant, Santa Clara, CA (US); Philip Alexander Cuadra, San Francisco, CA (US); Jerome F. Duluk, Jr., Palo Alto, CA (US)

(73) Assignee: NVIDIA Corporation, Santa Clara, CA (US)

(*) Notice: Subject to any disclaimer, the term of this patent is extended or adjusted under 35 U.S.C. 154(b) by 296 days.

(21) Appl. No.: 13/890,178

(22) Filed: May 8, 2013

(65) Prior Publication Data

US 2014/0337569 A1   Nov. 13, 2014

(51) Int. Cl.
*G06F 12/02* (2006.01)
*G06F 12/08* (2016.01)
*G06F 9/48* (2006.01)

(52) U.S. Cl.
CPC ........ *G06F 12/0804* (2013.01); *G06F 12/0802* (2013.01); *G06F 9/4843* (2013.01)

(58) Field of Classification Search
CPC   G06F 12/0804; G06F 12/0802; G06F 9/4843
USPC ........... 711/105, 113, 118, 142; 718/102, 104
See application file for complete search history.

(56) References Cited

U.S. PATENT DOCUMENTS

2013/0132967 A1*   5/2013   Soundararajan et al. ..... 718/104
2014/0172790 A1*   6/2014   Pathak .............. G06F 17/30132
                                                                707/613

* cited by examiner

*Primary Examiner* — Jasmine Song
(74) *Attorney, Agent, or Firm* — Zilka-Kotab, PC

(57) ABSTRACT

A system, method, and computer program product for low-latency scheduling and launch of memory defined tasks. The method includes the steps of receiving a task metadata data structure to be stored in a memory associated with a processor, transmitting the task metadata data structure to a scheduling unit of the processor, storing the task metadata data structure in a cache unit included in the scheduling unit, and copying the task metadata data structure from the cache unit to the memory.

20 Claims, 7 Drawing Sheets

| Task Meta Data 400 | |
|---|---|
| Program_Offset | 410 |
| Grid_Dimensions | 420 |
| Block_Dimensions | 430 |
| Resources | 440 |
| Cache_Control | 450 |
| Memory_Barriers | 460 |
| Semaphores | 470 |
| ⋮ | |

*Fig. 4*

SYSTEM, METHOD, AND COMPUTER PROGRAM PRODUCT FOR LOW LATENCY SCHEDULING AND LAUNCH OF MEMORY DEFINED TASKS

FIELD OF THE INVENTION

The present invention relates to task management, and more particularly to the latency associated with loading tasks from memory.

BACKGROUND

Programming tasks are typically implemented by generating a data structure in a memory that includes information associated with instructions and data to be processed by those instructions. Programming tasks may be written to a memory by one processor and then launched on the same processor or another processor. When such tasks are scheduled and launched, the task typically resides in the memory and must first be loaded into an on-chip memory such as a level-1 or level-2 cache. Such memory read requests are high latency operations that may cause the processor to stall while the memory where the data structure is stored processes the read requests and transfers the data to the on-chip memory. This latency delays the launch of a task until the task is resident in the on-chip memory, thereby decreasing the efficiency of the processor in scheduling and launching the tasks. Thus, there is a need for addressing this issue and/or other issues associated with the prior art.

SUMMARY

A system, method, and computer program product for low-latency scheduling and launch of memory defined tasks. The method includes the steps of receiving a task metadata data structure to be stored in a memory associated with a processor, transmitting the task metadata data structure to a scheduling unit of the processor, storing the task metadata data structure in a cache unit included in the scheduling unit, and copying the task metadata data structure from the cache unit to the memory.

BRIEF DESCRIPTION OF THE DRAWINGS

FIG. 4 illustrates a task metadata (TMD) data structure, in accordance with one embodiment;

DETAILED DESCRIPTION

A hardware scheduling mechanism for a multi-threaded processor is described below. The hardware scheduling mechanism provides a means to implement task scheduling, including dependent execution of tasks, out-of-order execution of tasks, prioritization of tasks, and preemption of tasks. A task is associated with a task metadata data structure that encapsulates the task state necessary for configuring a processing unit to complete some subset of work (i.e., a program kernel configured to process data). In one embodiment, a central processing unit (CPU) is coupled to a parallel processing unit (PPU) and the PPU is configured to execute one or more tasks. The tasks are written to a memory accessible by the PPU by either a device driver executing on the CPU or predecessor tasks executed on the PPU. In order to launch a task on the PPU, a method call is sent to the PPU that points to a task metadata data structure in the memory. The PPU then loads the task state defined by the task metadata data structure from the memory and launches the task on a processing unit of the PPU.

Because of the latency associated with loading a task metadata data structure from the memory, and because the PPU is typically responsible for receiving the data that defines the task state from the CPU and then storing the data in the memory, in one embodiment, the hardware scheduling mechanism includes a local cache for storing one or more task metadata data structures recently written to a memory associated with the processor. The task state for the most recently received tasks are, therefore, resident in on-chip memory and available for low-latency scheduling and launch.

Figure 1:
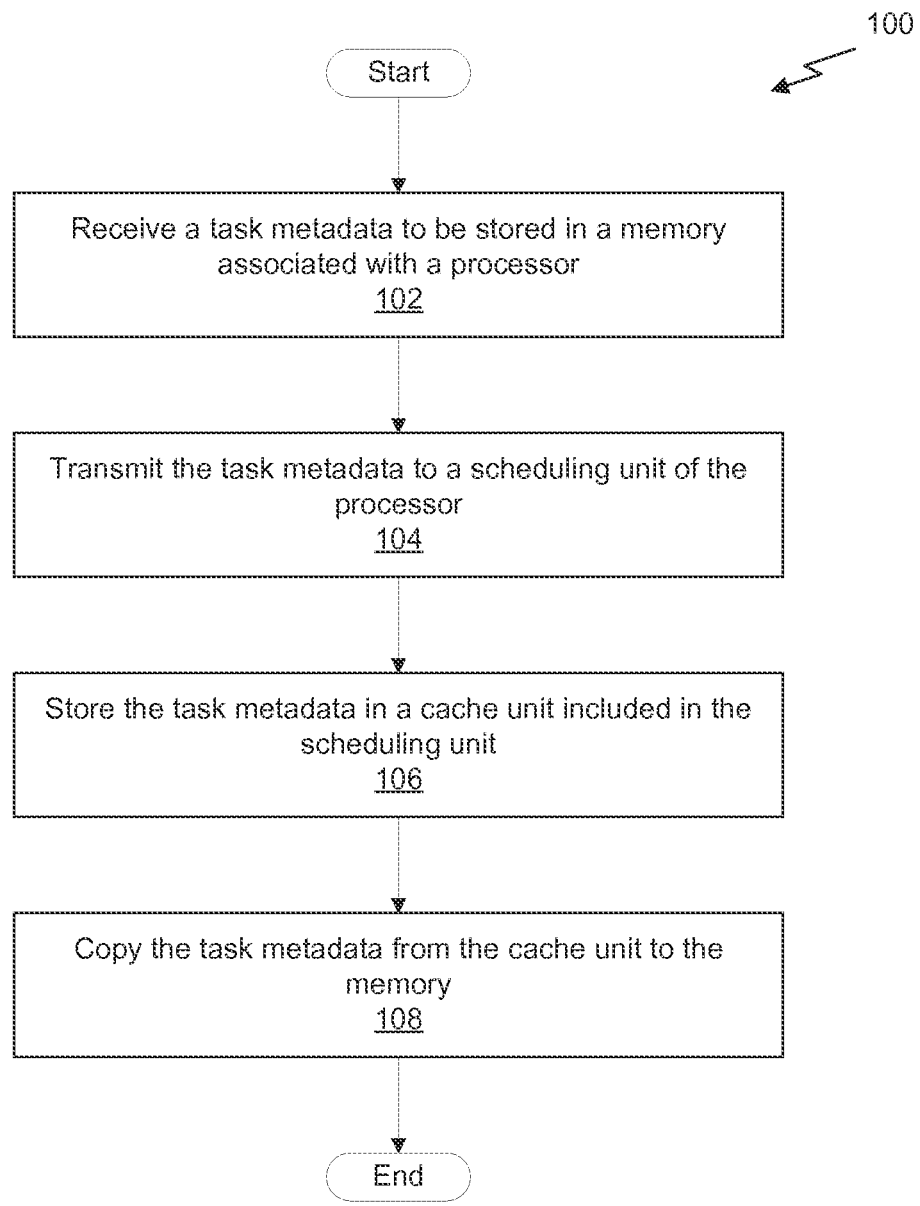
FIG. 1 illustrates a flowchart of a method 100 for writing task metadata to a memory, in accordance with one embodiment.

FIG. 1 illustrates a flowchart of a method 100 for writing task metadata to a memory, in accordance with one embodiment. At step 102, a task metadata to be stored in a memory associated with a processor is received. In one embodiment, the task metadata includes one or more fields that include data that encapsulates the task state required to configure a processing unit to execute the task. At step 104, the task metadata is transmitted to a scheduling unit of the processor. At step 106, the task metadata is stored in a cache unit included in the scheduling unit. In one embodiment, the cache unit is a write-through cache. At step 108, the task metadata is copied from the cache unit to the memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
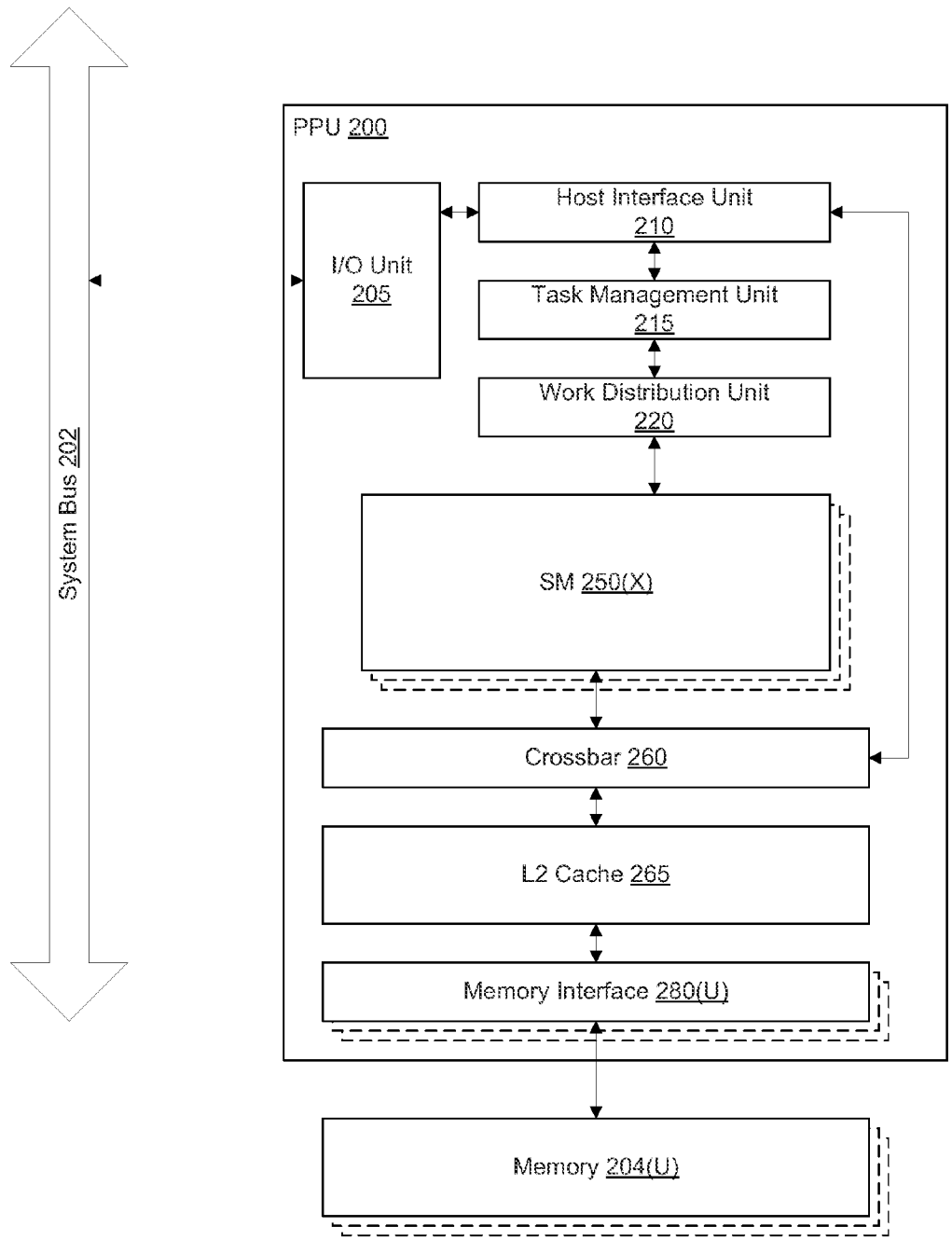
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
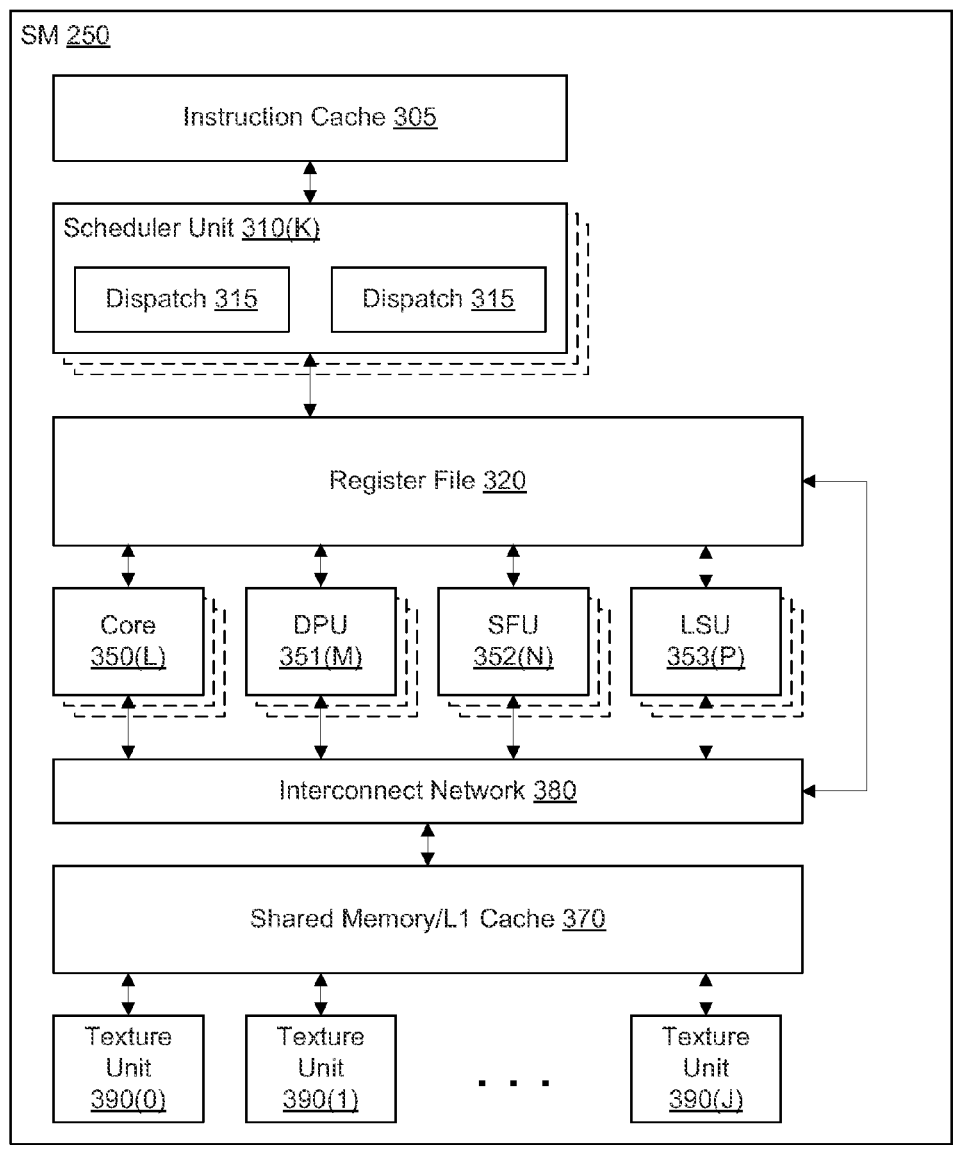
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mipmaps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Task Management Unit

FIG. 4 illustrates a task metadata (TMD) 400 data structure, in accordance with one embodiment. The TMD 400 includes a plurality of fields that encapsulate task state information associated with a task. In one embodiment, the TMD 400 includes a program offset field 410, a grid dimensions field 420, a block dimensions field 430, a resources field 440, a cache control field 450, a memory barriers field 460, and a semaphores field 470. Although not shown, the TMD 400 may include other fields in addition to the fields shown in FIG. 4. It will be appreciated that the TMD 400 shown in FIG. 4 is for illustrative purposes only. The particular fields included in the TMD 400 encapsulate the task state required to configure a processing unit (e.g., the SM 250) to execute the task. Consequently, when a TMD 400 is implemented for different architectures, the corresponding TMD 400 may include fields in addition to or in lieu of the fields shown in FIG. 4.

In one embodiment, the program offset field 410 stores a memory offset for the start of program instructions for the task. The grid dimensions field 420 includes grid dimensions for the grid. A grid is an array of thread blocks generated to implement the program specified by the program offset field 410 on different sets of input data (e.g., pixel data) corresponding to each thread. The grid may be one-dimensional, two-dimensional, three-dimensional, or n-dimensional. In one embodiment, the grid dimensions field 420 includes an x-dimension, a y-dimension, and a z-dimension for the size of a three-dimensional grid array. The block dimensions field 430 stores the dimension for each of the thread blocks and is equal to the number of threads included in each thread block (e.g., 32). The resources field 440 includes state information related to hardware resources allocated to the task. For example, the resources field 440 may include a location and size of a circular queue, implemented in a memory, that stores thread blocks to be added to the task. The cache control field 450 includes data associated with configuring the cache. For example, the cache control field 450 may include data that specifies what portion of the L1 cache/shared memory 270 is configured as a cache and what portion is configured as a shared memory. The cache control field 450 may also specify how much memory is allocated to each thread in a thread block. The memory barriers field 460 may include counters that are configured to manage task dependency. Similarly, the semaphores field 470 may include pointers to semaphores that should be released when a task is completed.

The TMD 400 defines, in the memory 204, the encapsulated state information necessary to execute a particular task on a processing unit of the PPU 200. In other words, the TMD 400 may be generated in the memory 204 and the fields of the TMD 400 may be filled by software, either a device driver or application executing on the CPU or a different task executing on the PPU 200, and then a pointer to the TMD 400 is passed to the TMU 215 in the PPU 200 to indicate that the task is ready to be scheduled. In some system implementations, the TMD 400 for a task is written into a system memory (i.e., a memory associated with the CPU) and then copied to a video memory (i.e., memory 204). One mechanism for copying the task to the video memory involves transmitting packets of data from the system memory to the PPU 200 via the system bus 202. The PPU 200 then uses various hardware engines to store the data in the video memory. Once the PPU 200 is ready to schedule the task, the TMD 400 (or at least portions of the TMD 400) is read from the video memory into on-chip memory structures accessible to the TMU 215 and/or the SMs 250. Because memory access requests for writing and reading the data have a high-latency, the conventional techniques have a high-latency between the time when the task state associated with a task is generated and the time when a task can be launched. A new hardware mechanism for transmitting task metadata to the PPU 200 is described that uses a different hardware mechanism for copying the task metadata to the memory 204 than the hardware mechanism for different types of data copied to the memory 204.

Figure 5:
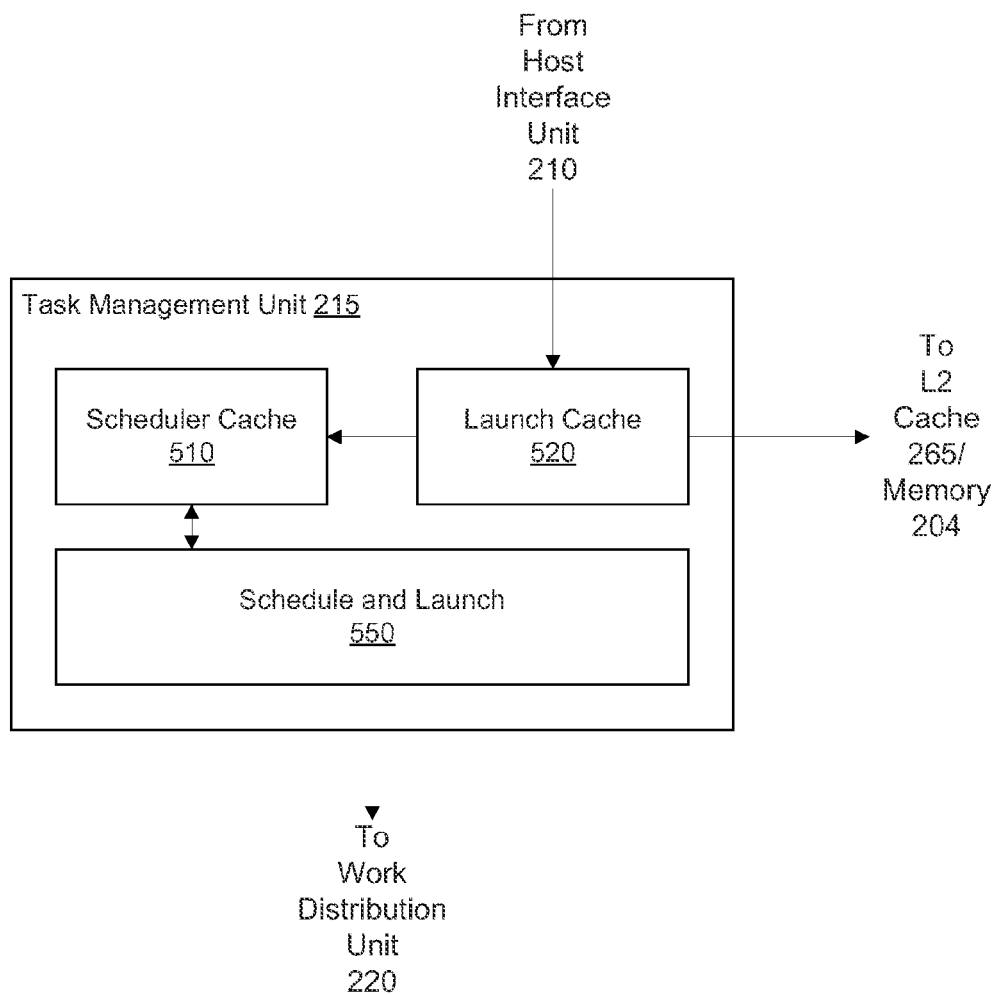
FIG. 5 illustrates the TMU of FIG. 2, in accordance with one embodiment.

FIG. 5 illustrates the TMU 215 of FIG. 2, in accordance with one embodiment. As shown in FIG. 5, the TMU 215 includes a scheduler cache unit 510, a launch cache unit 520, and a schedule and launch (SL) unit 550. In modern architectures, a task can be launched in one of two ways. The driver kernel executing on a CPU can launch tasks remotely by generating the TMD 400 for the task in a system memory, storing the TMD 400 in memory 204, and then transmitting a pointer to the TMD 400 to the host interface unit 210 and, ultimately, to the TMU 215 indicating that the task is ready to be scheduled. Alternatively, tasks executing on the PPU 200 can launch child tasks locally by generating a TMD 400 in memory 204 and transmitting a pointer to the TMD 400 to the TMU 215. Tasks executing on the SMs 250 of the PPU 200 may transmit messages to the TMU 215 indicating that the task is ready to be scheduled utilizing messages (i.e., data packets) reflected to the TMU 215 via an internal bus and a memory management unit (not explicitly shown). These messages may not be handled by the host interface unit 205 and instead are routed from the SM 250 to the memory management unit and from the memory management unit to the TMU 215.

When the TMU 215 receives an instruction that indicates a task is ready to be scheduled, the TMU 215 may pull at least a portion of the TMD 400 associated with the task from the memory 204. In one embodiment, the TMU 215 includes a scheduler cache 510 that buffers the portions of one or more TMDs 400 in an on-chip memory accessible by the TMU 215. The data in the portion of the TMD 400 may be analyzed by the TMU 215 to resolve dependencies between tasks to determine whether the task is ready to be launched. For example, the TMD 400 may include approximately 256 bytes of information related to the state encapsulating a task. The scheduler cache 510 may include entries that are sized to hold a portion (e.g., 64 bytes) of the TMD 400 that is used to resolve dependencies for the task, delaying retrieval of the full TMD 400 from memory 204 until the task is ready to be launched. Once the input dependencies for a task have been resolved, the task may then be sent to the SL unit 550 to be scheduled and launched. The SL unit 550 is configured to retrieve the remaining fields of the TMD 400 for the task and transmit the task state (i.e., the data included in the TMD 400) to the WDU 220 such that the task can be executed on one or more of the SMs 250.

Conventionally, a CPU (e.g., a device driver) could make the TMD 400 accessible to the PPU 200 in multiple ways. In one technique, the driver could write the TMD 400 to a system memory that is also accessible to the PPU 200. Then, the driver could transmit a command to one or more copy engines on the PPU 200 that copy the data in the system memory to the video memory; i.e., memory 204. Once the data was copied, the driver could pass a command with a pointer to the TMD 400 in memory 204 to the TMU 215 that indicated that the task was ready to be scheduled. Another technique for making the TMD 400 accessible to the PPU 200 is to stream the data to the PPU 200 through a pushbuffer (i.e., a circular queue in memory that was accessible to both the CPU and the PPU 200, where the CPU could write instructions and data into the pushbuffer and the PPU 200 could read the instructions and data from the pushbuffer, thereby allowing asynchronous operation of the CPU and the PPU 200). The driver would first write an instruction to the pushbuffer indicating that the data immediately following the instruction in the pushbuffer is associated with an inline memory request. The instruction may include any necessary state for the PPU 200 to process the inline memory request, such as a length of the data, a destination address in the memory 204 to store the data, and so forth. Then the driver would stream the data for the TMD 400 into the pushbuffer. The PPU 200, via the I/O unit 205 and the host interface unit 210, would receive and decode the inline memory request instruction from the pushbuffer and configure the crossbar 260 to transmit the data for the TMD 400 to the memory 204 at an address specified by the instruction. If the TMD 400 was generated by a task executing on the PPU 200, then the task could simply write the data for the TMD 400 to the memory 204 via existing mechanisms in the SM 250.

It will be appreciated that these conventional techniques for storing a TMD 400 in the memory 204 create a high latency between when the task state for a task is generated and stored in the memory 204 and when the task state is available in an on-chip memory and ready to be transmitted to the WDU 220 for launch. First, the TMD 400 must be stored in the memory 204 and the PPU 200, via the host interface unit 210, must wait to receive an acknowledgement from the memory 204 that the write was successful. Then, the TMU 215 can read a first portion of the TMD 400 from the memory 204, storing the first portion of the TMD 400 in the scheduler cache unit 510. Finally, once all input dependencies for the task have been resolved, the remaining fields of the TMD 400 can be fetched from the memory 204 and the task can be launched by the SL unit 550. Receiving the TMD 400 at the PPU 200, storing the TMD 400 in the memory 204, retrieving a first portion of the TMD 400 from the memory 204, and retrieving the second portion of the TMD 400 from the memory 204 create a very inefficient and high-latency operation that delays the launching of tasks that are otherwise available for immediate launch. Therefore, a different mechanism is proposed for storing TMDs 400 received by the PPU 200 such that the latency between when a task is ready to be launched and when the task is launched is reduced.

In one embodiment, a new instruction that is similar to the inline memory request described above is capable of being executed by the PPU 200. A new inline task memory request is defined that indicates to the PPU 200 that the data being copied to the memory 204 via the pushbuffer should be transmitted to the TMU 215 to be copied out to the memory 204 rather than being handled by the host interface unit 210. The host interface unit 210 receives the inline task memory request as well as the data defining a task state (i.e., TMD 400) and transmits the inline task memory request and the data to the TMU 215. The TMU 215 writes the data associated with the inline task memory request to a launch cache unit 520. The launch cache unit 520 provides temporary on-chip memory storage for one or more full TMDs 400. The scheduler cache unit 510 and the SL unit 550 are configured to check the launch cache unit 520 to determine whether a copy of the TMD 400 is already stored in the launch cache unit 520 before requesting the data for a task from the memory 204. If the TMD 400 is stored on-chip in the launch cache unit 520, then the launch cache unit 520 indicates a cache hit and the data is available for launch with low latency. However, if the TMD 400 is not stored in the launch cache unit 520, or has been evicted from the launch cache unit 520, then the launch cache unit 520 indicates a cache miss and the data is retrieved from the memory 204. Thus, when a TMD 400 is received by the PPU 200, the TMD 400 is stored in an available slot of the launch cache unit 520 before being copied out to memory 204. As long as the TMD 400 has not been evicted from the launch cache unit 520 when the TMU 215 receives an instruction that indicates the task is ready to be scheduled, then the data for the TMD 400 is already resident in on-chip memory accessible to the TMU 215, and the task can be launched with a lower latency than associated with the prior art techniques.

In one embodiment, the launch cache unit 520 is a write-through cache such that the data written to the launch cache unit 520 is also transmitted to the memory 204 as the data is written into the launch cache unit 520. After the TMD 400 has been written to the launch cache unit 520, an instruction may be transmitted to the TMU 215 that includes a pointer to the TMD 400. The TMU 215 is configured to receive this instruction and read a first portion of the TMD 400 from the memory 204. The scheduler cache unit 510 transmits a memory read request to the launch cache unit 520 to retrieve the first portion of the TMD 400 from the memory 204. Because the task was recently copied into the launch cache unit 520, the memory read request results in a cache hit and the first portion of the TMD 400 is copied from the launch cache unit 520 to the scheduler cache unit 510. This operation is performed with low-latency because the full TMD 400 is resident in on-chip memory. The TMU 215 may then resolve any input dependencies for the task. Once the input dependencies for the task have been resolved, the SL unit 550 retrieves task state information for the task from the scheduler cache unit 510 and/or the launch cache unit 520 such that the task state can be transmitted to the WDU 220 so that the task can be launched. It will be appreciated that other information may also be examined when determining which task should be launched in addition to the input dependency information. For example, a task priority may be examined to determine the highest priority task that is eligible for launch or system resources may be examined to determine that there are available processors (i.e., SMs 250) or memory to launch the task.

When the SL unit 550 receives the task state, the SL unit 550 may transmit a memory read request to the launch cache unit 520 to read additional fields of the TMD 400 that are not resident in the scheduler cache 510. Again, because the TMD 400 was recently copied into the launch cache unit 520, the memory read request results in a cache hit and the remaining portion of the TMD 400 is copied from the launch cache unit 520 to the SL unit 550. This operation is also performed with low-latency because the full TMD 400 is resident in on-chip memory. This multi-level cache hierarchy implemented in the TMU 215 as well as the new method for storing TMDs 400 in the memory 204 via the TMU 215 allow low latency scheduling and launch of memory-defined tasks transmitted to the PPU 200 relative to prior art techniques.

In another embodiment, the launch cache unit 520 is a write-back cache. It will be appreciated that the launch cache unit 520 stores a local copy of the TMD 400 for use by the SL unit 550. However, the task state information stored in the TMD 400 may need to be accessible to the SMs 250 once the task is launched. Because the SMs 250 do not have access to the launch cache unit 520, the TMU 215 implements a mechanism that initiates a write-back of the TMD 400 stored in the launch cache unit 520 when a task is launched. That way, the TMD 400 is not immediately copied to memory 204 when received by the TMU 215, but is only copied to memory 204 when the task is launched on the SM 250. In such cases, care must be taken that the task state in a TMD 400 has been successfully written to the memory 204 (e.g., by waiting to transmit the task state data to the WDU 220 until an acknowledgement has been received that the data is stored in the memory 204) before a task executed on the SMs 250 attempts to access the task state for the TMD 400 in the memory 204.

In one embodiment, when the launch cache unit 520 is full, the TMD 400 is not stored in the launch cache unit 520. Instead, the TMD 400 is simply copied into the memory 204. In such cases, when the scheduler cache unit 510 attempts to load the first portion of the TMD 400 into the on-chip memory, the launch cache unit 520 will indicate a cache miss and retrieve the data for the first portion of the TMD 400 from the memory 204. In other words, the launch cache unit 520 may not implement an eviction policy when the cache is full. In another embodiment, the launch cache unit 520 may implement an eviction policy to free up an entry in the launch cache unit 520 when a new TMD 400 is received by the TMU 215. For example, the launch cache unit 520 may track, via a counter or other mechanism, an order for which TMDs 400 are received by the TMU 215. When the launch cache unit 520 determines that the launch cache unit 520 is full, the launch cache unit 520 may evict the TMD 400 associated with the longest pending task from the launch cache unit 520. Other eviction policies may be implemented such as eviction based on random selection of an entry, eviction based on a task priority value, and so forth. In one embodiment, care is taken that no TMDs 400 associated with tasks that are ready to be launched should be evicted from the launch cache unit 520. For example, when the dependencies have been resolved for a task but the SL unit 550 is waiting for the WDU 220 to be ready to accept a new task. In another embodiment, care is taken that no TMDs 400 associated with tasks that have been recently launched and then preempted should be evicted from the launch cache unit 520. Such tasks are likely to be ready to be executed in the near future and, therefore, the TMDs 400 associated with such tasks should not be evicted from the launch cache unit 520 to make room for a newly arriving TMD 400.

In one embodiment, the TMD 400 includes read-only fields and hardware-writeable fields. The read-only fields are written by software when the TMD 400 is generated and cannot be updated by the TMU 215 in the launch cache unit 520. Thus, these fields cannot be dirty in the launch cache unit 520. However, the hardware-writeable fields can be updated periodically by the TMU 215 after being read from the launch cache unit 520 and stored in the scheduler cache unit 510 or in other registers internal to the TMU 215. When the TMU 215 overwrites this data, the launch cache unit 520 may mark the data as dirty and schedule a write-back to the memory 204 to keep coherence with the copy of the TMD 400 in the memory 204. Again, when a task is launched by transmitting the task state to the WDU 220, the TMU 215 is configured to ensure that any dirty data in the launch cache unit 520 for the task is updated in the memory 204 to be accessible to the SMs 250. In another embodiment, the scheduler cache unit 510 may be configured to read and write the hardware-writeable fields directly from/to memory 204, bypassing the launch cache unit 520. Thus, only the read-only fields are read into the launch cache unit 520 and read from the launch cache unit 520 by the scheduler cache unit 510. In such embodiments, the SL unit 550 is configured to read the read-only fields from the launch cache unit 520 and the hardware-writeable fields from the scheduler cache unit 510.

In some embodiments, the TMDs 400 are generated by tasks executing on the SMs 250 in the PPU 200. In such embodiments, instead of storing the TMD 400 in the memory 204 directly, the SMs 250 may generate messages that are transmitted to the TMU 215 via a reflected interface implemented by a memory management unit. These messages may contain the equivalent instruction for the inline task memory request as well as the data that defines the TMD 400 for a task. By transmitting these messages to the TMU 215, the task being executed by the SMs 250 may use the TMU 215 to store the task in the memory 204 rather than storing the TMD 400 in the memory 204 directly and then requiring the TMU 215 to read the task from the memory 204.

In another embodiment, the PPU 200 may enable context switching between different time-slice groups (TSGs). A TSG includes all of the tasks that are communicating via a single virtual channel within the PPU 200. The TSG, in effect, allows different tasks to be switched into and out of the state of the PPU 200 to enable different sets of tasks to be executed substantially concurrently. Because the inline task memory request relies on state within the TMU 215 in order to process continually incrementing addresses in memory for storing the TMDs 400, this state must be stored and re-loaded whenever context switching is performed. In addition, the PPU 200 should be configured to resume the same inline task memory request when a particular TSG context is restored that was in progress when the TSG context was switched out.

Figure 6:
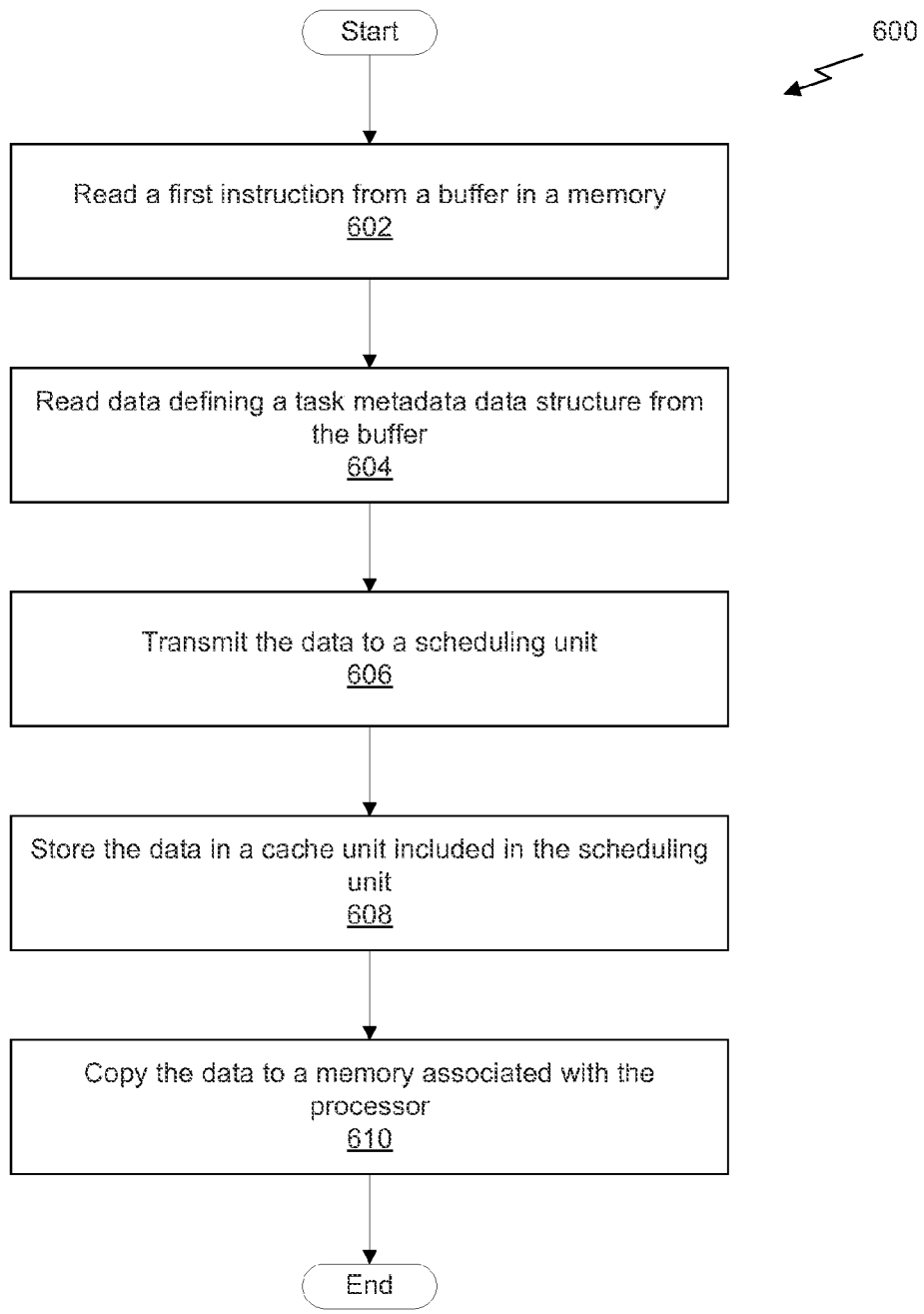
FIG. 6 illustrates a flowchart of a method for storing a task metadata data structure in a memory, in accordance with another embodiment.

FIG. 6 illustrates a flowchart of a method 600 for storing a TMD 400 in a memory, in accordance with another embodiment. At step 602, the I/O unit 205 reads a first instruction from a buffer in a memory and decodes and transmits the first instruction to a host interface unit 210. The buffer may be a pushbuffer (i.e., a circular buffer) for transmitting instructions and data between a CPU and the PPU 200 and may be located in a system memory (e.g., a dynamic random access memory coupled to the system bus 202). In one embodiment, the first instruction is an inline task memory request that indicates that data following the first instruction in the pushbuffer defines a TMD 400 for a task. The host interface unit 205 handles the first instruction and transmits the first instruction as well as data that follows the instruction to the TMU 215 for processing. At step 604, the I/O unit 205 reads at least a portion of the TMD 400 (i.e., one or more fields of the TMD 400) from the pushbuffer. The fields of the TMD 400 may be stored in a range of consecutive memory addresses following the first instruction in the pushbuffer. At step 606, the one or more fields of the TMD 400 are transmitted to a scheduling unit, such as the TMU 215. At step 608, the TMU 215 stores the one or more fields of the TMD 400 in the launch cache unit 520. At step 610, the TMU 215 transmits a copy of the one or more fields of the TMD 400 to the memory 204.

Figure 7:
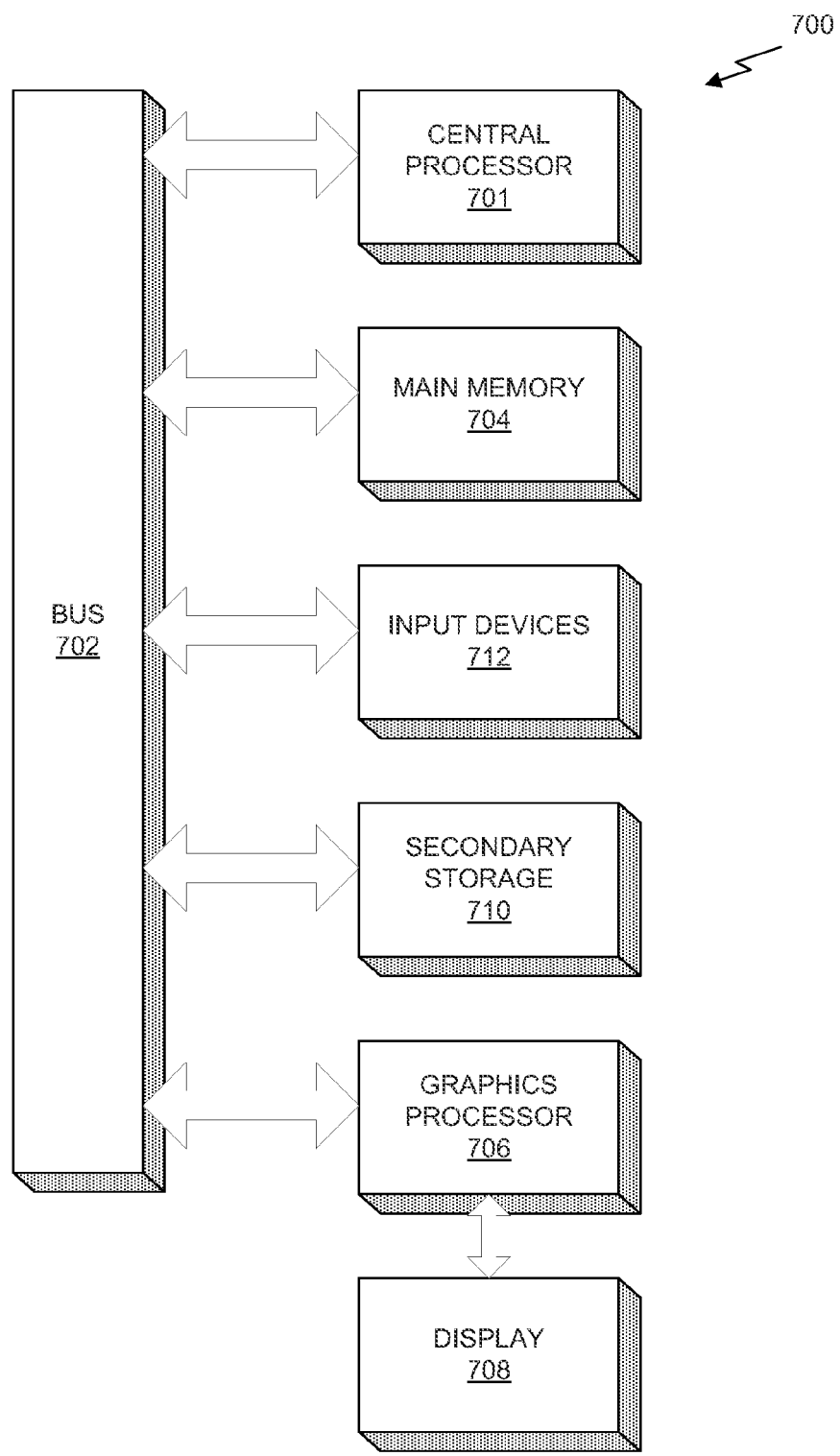
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter. For example, the central processor 701 may execute a driver kernel that generates TMDs 400 for execution by the graphics processor 706, and the graphics processor 706 may include the TMU 215 configured to receive a copy of the TMDs 400 and store a copy of the TMDs 400 in a cache unit in the TMU 215.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   receiving a task metadata data structure (TMD) associated with a task to be stored in a memory associated with a processor;
   transmitting the TMD to a scheduling unit of the processor;
   storing the TMD in a cache unit included in the scheduling unit; and
   copying the TMD from the cache unit to the memory,
   wherein the task is configured to be executed on a processing unit of the processor.

2. The method of claim 1, further comprising:
   receiving an instruction that indicates the task is ready to be scheduled on the processor; and
   copying a first portion of the TMD to a second cache unit included in the scheduling unit.

3. The method of claim 2, further comprising:
   resolving dependencies associated with the task; and
   reading the first portion of the TMD from the second cache unit and reading a second portion of the TMD from the cache unit; and
   transmitting the first and second portions of the TMD to a work distribution unit.

4. The method of claim 1, wherein the cache unit is a write-through cache.

5. The method of claim 1, wherein the cache unit is a write-back cache that is configured to copy the TMD back to the memory before the task is launched for execution.

6. The method of claim 1, wherein receiving the TMD comprises:
   reading a first instruction from a buffer in a memory, wherein the first instruction indicates that data following the first instruction in the buffer defines the TMD;
   reading the data from the buffer; and
   transmitting the data to the scheduling unit to be stored in the cache unit.

7. The method of claim 6, further comprising receiving a second instruction that indicates the task is ready to be scheduled on the processor, wherein the second instruction includes a pointer to the TMD in the memory.

8. The method of claim 6, wherein the first instruction causes the data following the first instruction to be stored in the cache unit, and wherein the data in the cache unit is copied into a second cache unit within the scheduling unit.

9. The method of claim 1, wherein the processor is a parallel processing unit coupled to a second processor.

10. The method of claim 9, wherein receiving the TMD comprises:
    reading an instruction from a buffer that is accessible by both the processor and the second processor, wherein the instruction is written to the buffer by the second processor and read from the buffer by the processor; and
    decoding the instruction in a host interface unit of the processor.

11. The method of claim 1, further comprising:
    determining that the cache unit is full; and
    evicting at least one entry in the cache unit.

12. The method of claim 1, wherein the TMD is generated by a processing unit within the processor and transmitted to the scheduling unit by a memory management unit configured to transmit packets of data between the processing unit and one or more other units of the processor.

13. A non-transitory computer-readable storage medium storing instructions that, when executed by a processor, cause the processor to perform steps comprising:
    receiving a task metadata data structure (TMD) associated with a task to be stored in a memory associated with a processor;
    transmitting the TMD to a scheduling unit of the processor;
    storing the TMD in a cache unit included in the scheduling unit; and
    copying the TMD from the cache unit to the memory,
    wherein the task is configured to be executed on a processing unit of the processor.

14. The non-transitory computer-readable storage medium of claim 13, wherein the cache unit is a write-through cache.

15. The non-transitory computer-readable storage medium of claim 13, wherein receiving the TMD comprises:
    reading a first instruction from a buffer in a memory, wherein the first instruction indicates that data following the first instruction in the buffer defines the TMD;
    reading the data from the buffer; and
    transmitting the data to the scheduling unit to be stored in the cache unit.

16. A system, comprising:
    a memory; and
    a processor coupled to the memory and that includes a scheduling unit having a cache unit, the processor being configured to:
      receive a task metadata data structure (TMD) associated with a task to be stored in the memory,
      transmit the TMD to the scheduling unit,
      store the TMD in the cache unit; and
      copy the TMD from the cache unit to the memory,
      wherein the task is configured to be executed on a processing unit of the processor.

17. The system of claim 16, wherein the cache unit is a write-through cache.

18. The system of claim 16, wherein receiving the TMD comprises:
    reading a first instruction from a buffer in a memory, wherein the first instruction indicates that data following the first instruction in the buffer defines the TMD;
    reading the data from the buffer; and
    transmitting the data to the scheduling unit to be stored in the cache unit.

19. The system of claim 16, further comprising a second processor and a system memory, wherein the system memory comprises a dynamic random access memory (DRAM) accessible to both the processor and the second processor.

20. The system of claim 16, wherein the processor comprises a graphics processing unit.

* * * * *